UNITED STATES PATENT OFFICE.

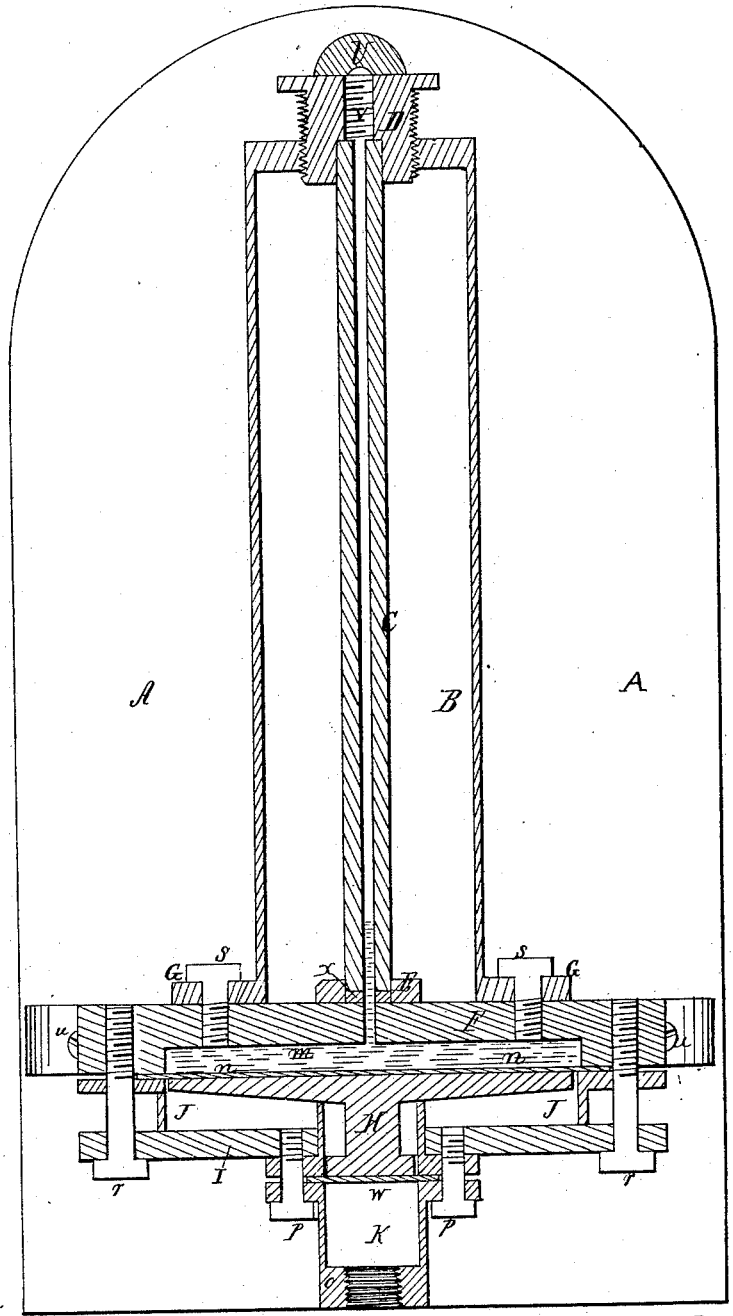

THOMAS SHAW, OF PHILADELPHIA, PENNSYLVANIA, ASSIGNOR TO HIMSELF AND PHILIP F. JUSTICE.

IMPROVED STEAM-GAGE.

Specification forming part of Letters Patent No. 37,794, dated February 24, 1863.

*To all whom it may concern:*

Be it known that I, THOMAS SHAW, of the city and county of Philadelphia, Pennsylvania, have invented a new and Improved Mode of Constructing Steam-Gages; and I hereby declare the following to be a full, clear, and exact description of the same, reference being had to the accompanying drawings, and to the letters of reference marked thereon.

The nature of my invention consists in the employment of mercury in a manner as hereinafter described.

In order to enable others to use and practice my invention, I will proceed to describe its construction and operation.

On reference to the accompanying drawing, (which forms a part of the specification,) which represents a vertical section through the center of the gage, F is a disk, of cast-iron or other suitable material, having on its under side a recess, $m$, for the insertion of mercury, as hereinafter described.

J is a cylindrical metallic ring firmly secured between disks I and F by means of screws $r$ $r$.

$n$ $n$ is a disk, of india-rubber, clamped between ring J and disk F for the purpose as hereinafter described; W, a disk, of rubber, clamped between pipes K by means of screws P P, said screws uniting the whole firmly to disk I, for the purpose as hereinafter described.

O is a screw for the admission of a steam-pipe.

H is a disk, the upper and larger end of which fits loosely in ring J and presses against rubber disk $n$ $n$. The lower end of said disk H plays loosely in pipe K, and resting upon rubber disk W. Said disk's (H) downward movement is limited by resting upon the upper end of pipe K.

The chamber or recess $m$ is filled with mercury for the purpose as hereinafter described.

C is a glass tube the bore of which is connected with chamber $m$ by means of an aperture through the center of disk F on a line with said glass tube.

E is a boss, to prevent any lateral motion of glass tube.

X is a piece of rubber intervening between glass tube and disk F, for the purpose of making a tight joint between said disk and glass tube, and for the further purpose of compensating for any unequal expansion between the metal and glass.

B is a brass tube for the supporting and protection of glass tube. Said tube B has a slot down the center of the front for the purpose of viewing said glass tube. Upon the edge of said slot are figures indicating the pounds pressure per square inch. Said tube is united to disk F by means of a ring. G, extending from the periphery of the lower edge of pipe B, through which pass screws $s$ $s$ into disk F. The upper end of said pipe B has a female screw, through which passes screw D, screwing firmly down upon glass tube C for the purpose of making a tight joint at $x$.

$v$ is a female screw through the center of D, for the purpose of inserting a screw with a piece of rubber on end, in order to close the aperture in tube C, that the same may be transported with mercury in it without the risk of spilling the same. There is an aperture leading into chamber $m$ from the periphery of disk F, for the purpose of inserting the mercury. Said aperture is closed by means of a screw. The whole of which apparatus is united by means of screws and projections U $u$ $u$ to the board A.

The apparatus is operated in this wise: The steam on being admitted into chamber K presses forcibly upon the lower end of disk H, which force raises disk H, contracting the chamber $m$, forcing the mercury up the glass tube C in proportion to the amount of pressure in chamber K. As many times as the area of the lower end of disk H is less than the larger area of the upper end of disk H, so many times will the pressure per square inch be lighter in chamber $m$ than the pressure of steam in chamber K, which renders practicable the employment of a short column of mercury without any other opposing medium for the measurement of high pressures. The object of the rubber disks N and W are to prevent leakage. The movement of disk H being slight, (one-hundredth of an inch,) to send the column of mercury to the top of the tube there is little or no friction attending the same.

What I claim, and desire to secure by Letters Patent, is—

An apparatus when arranged substantially as set forth, and for the purpose specified.

THOMAS SHAW.

Witnesses:
 ELIAS J. SHAW,
 C. BRAZER.